United States Patent [19]

Shanoski et al.

[11] 4,222,929

[45] Sep. 16, 1980

[54] LOW-SHRINK IN-MOLD COATING

[75] Inventors: Henry Shanoski, Akron; Donald F. Reichenbach, Massillon, both of Ohio

[73] Assignee: The General Tire & Rubber Company, Akron, Ohio

[21] Appl. No.: 32,049

[22] Filed: Apr. 23, 1979

Related U.S. Application Data

[62] Division of Ser. No. 958,771, Nov. 8, 1978, Pat. No. 4,189,517.

[51] Int. Cl.³ .......................... C08K 3/22; C08K 3/26; C08K 3/34; C08K 3/36
[52] U.S. Cl. ............................... 260/40 TN; 525/126; 525/127; 525/131
[58] Field of Search ................... 260/40 TN; 525/126, 525/127, 131

[56] References Cited

U.S. PATENT DOCUMENTS

| | | | |
|---|---|---|---|
| 3,396,210 | 8/1968 | McKillip et al. | 260/40 TN X |
| 3,429,948 | 2/1969 | Massouhre | 525/127 X |
| 3,763,065 | 10/1973 | Hermann | 525/126 X |
| 3,824,201 | 7/1974 | McGranughan et al. | 525/126 X |
| 3,886,229 | 5/1975 | Hutchinson et al. | 260/40 TN X |
| 4,051,085 | 9/1977 | Hess et al. | 525/127 X |

FOREIGN PATENT DOCUMENTS 1455495 11/1976 United Kingdom ..................... 525/131

*Primary Examiner*—Sandra M. Person

[57] ABSTRACT

A laminate comprises an adherent in-mold thermoset coating composition on a thermoset polyester glass fiber substrate, the coating composition comprising essentially the reaction product of an unsaturated aliphatic fumarate polyester diol, a saturated polyester diol flexibilizer, a cross-linking aliphatic polyol having from 3 to 6 OH groups, a diisocyanate in an amount by weight sufficient to provide from about 50 to 120%, preferably from about 80 to 99%, of the stoichiometric amount of —NCO groups required to react with all of the active hydrogen atoms in the coating composition and an ethylenically unsaturated monomer sufficient to polymerize with and crosslink the unsaturated polyester in admixture with a minor amount by weight of polyvinyl acetate which serves to reduce or eliminate shrinkage of the coating composition.

6 Claims, No Drawings

LOW-SHRINK IN-MOLD COATING

This is a division of application Ser. No. 958,771 filed Nov. 8, 1978 now U.S. Pat. No. 4,189,517, issued Feb. 19, 1980.

This invention relates to a low-shrink thermoset in-mold coating composition containing a minor amount by weight of polyvinyl acetate.

BACKGROUND

A major deficiency of compression molded thermoset (cured) glass fiber reinforced polyester (FRP) moldings is surface imperfections such as pits, pores, surface cracks, waviness and sink marks requiring substantial post-curing handling such as sanding, filling and so forth requiring considerable expense in additional materials and labor. The in-mold coating process of U.S. Pat. No. 4,081,578 masks these imperfections by molding a low viscosity thermosetting composition onto the surface of the thermoset FRP part in a second molding operation. The resulting skin or thin adherent thermoset coating, however, experiences about an 8% volume shrinkage on curing although pits, pores, cracks, waviness and sink marks are generally eliminated. In the case of pits slight dimples in the coating at those locations sometimes remain. The shrinkage is due to polymerization and/or crosslinking and also due to thermal effects caused by cooling.

It is an object of the present invention to avoid the difficulties alluded to hereinabove and to provide an in-mold coating thermosetting composition which exhibits a reduced amount of or no shrinkage on molding and curing.

Another object of the present invention is to provide a thermoset polyester glass fiber reinforced part with an in-mold molded adherent thermoset coating which exhibits a reduced amount of or no shrinkage.

These and other objects and advantages of the present invention will become more apparent to those skilled in the art from the following detailed description and working examples.

DISCUSSION OF THE PRIOR ART

In copending U.S. Patent Application of Sigurdur I. Arnason, Ser. No. 814,502, filed July 11, 1977 there is disclosed an in-mold coating composition comprising a vinyl ester of the reaction product of acrylic acid and the diglycidyl ether of bisphenol A in styrene, $CaCO_3$, peroxide catalyst, inhibitor, mold release agent and polyvinyl acetate (40% PVA in STY monomer) as the low shrink additive. Additional styrene and other fillers can be used. While polyvinyl acetate is preferred, it is stated that copolymers of vinyl acetate such as the acidic copolymers and rubber or thermoplastic homopolymers and copolymers of butadiene such as copolymers of butadiene and styrene or acrylonitrile as well as polymethyl methacrylate, polyethylene and polystyrene, also, may be used as low shrink additives. Moreover, the ester resin may be replaced in part by other unsaturated polyester resins made from glycols and unsaturated dicarboxylic acids as well as those made from propylene oxide and maleic anhydride. Copending U.S. Patent Application of Sigurdur I. Arnason, Ser. No. 897,980, filed Apr. 20, 1978 (as a continuation-in-part of Ser. No. 814,502, above) has a similar disclosure and additionally discloses the use of a silicate filler having a sheet-like structure such as talc and mica and states that viscosity can be increased by using clay. Neither one of these applications discloses any data on shrinkage nor the use of any isocyanates or polyisocyanates.

U.S. Pat. No. 3,741,799 in column 3, lines 56–62, discloses that the polyester resin used in FRP molding compositions can be rendered low-shrink or low-profile by adding finely divided particles of thermoplastic resins like polymethyl methacrylate, polypropylene, polyethylene, high-impact polystyrene, etc., in solution with a cross-linkable monomer like styrene. It does not disclose polyvinyl acetate. It refers to Australian Patent Application No. 24,802/67 (based on U.S. Ser. No. 566,580 filed July 20, 1966; see U.S. Pat. No. 3,772,241 below). It has nothing to do with in-mold coating but is concerned with paint adhesion to an FRP part.

U.S. Pat. No. 3,772,241 discloses in column 4, lines 31–45, that in the FRP composition the thermosetting polymer can be, for example, homopolymers of methyl methacrylate, ethyl methacrylate, butyl methacrylate, methyl acrylate, ethyl acrylate, styrene, copolymers of methyl methacrylate and lower alkyl esters of acrylic and methacrylate acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, methacrylamide, methylol acrylamide, and cetyl stearyl methacrylate. Other useful examples of the thermoplastic polymer are styrene/acrylonitrile copolymers, vinyl chloride/vinyl acetate copolymers, cellulose acetate butyrate, and cellulose acetate propionate. The reference has nothing to do with in-mold coating and does not disclose polyvinyl acetate per se.

U.S. Pat. No. 3,883,612 discloses the preparation of a maleic anhydride-propylene glycol polyester partial prepolymer which is then reacted with dicyclopentadiene to make a dicyclopentadiene terminated polyester. Next there is reacted more propylene glycol with the DCPD partial polyester prepolymer. To this composition is added an unsaturated monomer like styrene and a functional thermoplastic polymer. The functional thermoplastic polymer is the terpolymer resulting from the copolymerization of an unsaturated ester like methyl methacrylate, an unsaturated acid like acrylic acid and vinyl acetate. The terpolymer apparently prevents phase separation between the styrene and polyester resin and also promotes thickening with chemical thickeners (col. 4, lines 63–68, and col. 6, lines 15–21). The composition is useful for molding with glass fibers and fillers. The reference does not disclose in-mold coating of an FRP part nor polyvinyl acetate.

German Offen. No. 2,448,929, laid-open Apr. 29, 1976, and English translation thereof (corresponds to U.S. Pat. No. 4,051,085), discloses a thermosetting composition useful for impregnating glass fibers and comprising a copolymerizable vinyl compound like styrene, a thermoplastic polymer, and an unsaturated polyester polyurethane. Fillers etc. can be added. Among the large number of thermoplastic polymers (m.w. 500–10,000,000, preferred m.w. 10,000–50,000; preferred m.w. 500–5,000 for polycondensates and addition compounds) disclosed, there is suggested homopolymers, copolymers and graft polymer of vinyl acetate. However, the preferred thermoplastic polymers are those containing acid groups and the cellulose esters such as cellulose acetoproprionate or butyrate. The only polyester shown in the examples is one made from maleic anhydride and propylene glycol having a molecular weight of 498, but it is stated that m.w. can be less than 1,240, preferably 370–930. The only polyester polyurethanes actually shown are in Tables II and III where tolylene diisocyanate and the polyester or polyester plus isopropyl alcohol are reacted in an equivalent ratio (NCO/OH+COOH) of 1:2 or 1:2.17 which represents 50% or less than 50% of the stoichiometric amount of NCO required to react with all of the active hydrogen atoms of the unsaturated polyester although it is stated that the equivalent ratio of NCO to OH is 1:1 to 1:3, preferably 1:1.5 to 1:2.5 (a NCO stoichiometry of 100 to 33%, preferably 67% to 40%). The presence of COOH will produce $CO_2$ and foaming. A flexibilizing low m.w. diol and an aliphatic low m.w. cross-linking polyol having from 3–6 OH groups are not shown. Depending on the pressures used Table VII, Runs 1–4, shows relative shrinkages of 20–38% and 49–79%.

French Pat. No. 2,364,119 (published April, 1978), and English translation thereof, discloses a sheet of polymethylmethacrylate containing an adherent layer of a composition of a polyester resin, styrene, polyvinylacetate (up to 10%) to improve adhesion, peroxide catalyst, amine accelerator, up to 30% glass fibers, and as a filler preferably $CaSO_4$ (19–25 wt. %). It does not disclose diisocyanates nor in-mold coating.

Union Carbide Corporation, "Bakelite" Low Profile Additives, Bulletin No. F46567, 16 pages, no date, shows on page 3 the use of LP-100 (40% polyvinyl acetate in styrene) in a polyester-styrene-glass fiber composition (BMC formula) to get low (0.3 mils/in.) shrinkage (about 4 parts by weight of PVA on 100 of total components). On page 14, it discloses the use of LP-90 (40% PVA in styrene) in a polyester-styrene-glass fiber premix formulation (BMC formula) composition but does not give any shrinkage data (about 3.9 parts PVA on 100 of total composition). This reference does not disclose in-mold coating nor diisocyanates.

SUMMARY OF THE INVENTION

According to the present invention there is provided a laminate comprising an adherent in-mold thermoset coating composition in-mold coated on a thermoset polyester glass fiber substrate, the coating composition comprises essentially the reaction product of an unsaturated aliphatic fumarate polyester diol, a saturated polyester diol flexibilizer, a crosslinking aliphatic polyol having 3 to 6 OH groups, a diisocyanate in an amount by weight sufficient to provide from about 50 to 120%, preferably from about 80 to 99%, of the stoichiometric amount of —NCO groups required to react with all of the active hydrogen atoms in the coating composition and an ethylenically unsaturated monomer sufficient to polymerize with and crosslink the unsaturated polyester in admixture with a minor amount by weight of polyvinyl acetate which serves to reduce or eliminate shrinkage of the coating composition.

The in-mold coating composition reduces the surface imperfections as discussed above and additionally provides for reduced or no shrinkage. The adhesion of the coating to the substrate can be very high and the surface is smoother. It is not precisely known what occurs, but it may be that during the thermosetting or curing of the in-mold coating composition the polyvinyl acetate exists as a separate phase and relieves the internal polymerization shrinkage forces by creating minute internal voids in the coating structure so that the bulk shrinkage of the coating remains at a minimum.

DISCUSSION OF DETAILS AND PREFERRED EMBODIMENTS

Polyvinyl acetate is a well known polymer and can be prepared by bulk, solution, emulsion or dispersion polymerization processes using free-radical catalysts. See Schildknecht, "Vinyl and Related Polymers," John Wiley & Sons, Inc., New York, 1952, page 323 to 341; Schildknecht, "Polymer Processes," High Polymers, Vol. X, Interscience Publishers, Inc., New York, 1956; Matthews, "Vinyl and Allied Polymers," Vol. 2, Iliffe Books, London, 1972; and "Encyclopedia of Polymer Science and Technology," Vol. 15, 1971, Interscience Publishers a division of John Wiley & Sons, Inc., New York, pages 577 to 677. The polyvinyl acetate is used in an amount of from about 2 to 20, preferably in an amount of from about 3 to 13, parts by weight per 100 parts by weight total of the (in-mold) coating composition. If too little polyvinyl acetate is used, the resulting coating evidences little improvement in reduction in shrinkage. If too much polyvinyl acetate is employed, the coating tends to be soft, cheesy and easily attacked by paint solvents.

The unsaturated aliphatic polyester is made by copolymerizing maleic anhydride and an alkylene oxide of 3 to 4 carbon atoms such as propylene oxide, butylene oxide, isobutylene oxide and so forth and mixture thereof. Propylene oxide is preferred. The alkylene oxide should be used in a molar ratio greater than the maleic anhydride to provide a polyester which is essentially or all OH terminated, e.g., a polyester diol. The polyester should have an average molecular weight of from about 1500 to 4500 and from about 8 to 30 internal aliphatic carbon-to-carbon double bonds. Up to about 10 mol % of the maleic anhydride may be replaced with a saturated anhydride such as phthalic anhydride or other anhydride and mixture thereof as shown in U.S. Pat. No. 3,538,043. Also, up to 10 mol % of the alkylene oxide moiety may be ethylene oxide; greater amounts are undesirable since it may lead to water sensitivity in the final product. These unsaturated polyesters are made in benzene, styrene or other solvent using a double metal cyanide catalyst as shown in U.S. Pat. No. 3,538,043. As shown in said patent an isomerization catalyst such as piperidine is used to isomerize the maleate double bonds of the polyester to fumarate double bonds. Morpholine, also, may be used as an isomerization catalyst as shown by U.S. Pat. No. 3,576,909.

Polyesters made by reacting maleic anhydride or maleic acid with a glycol like propylene glycol, dipropylene glycol, 1,4-butane diol and so forth may likewise be used, but such esterification processes are time consuming and require high temperatures which are expensive. Esters made by processes using catalysts like titanium compounds are undesirable since it is difficult to remove the titanium catalyst residues which can adversely accelerate the isocyanate —OH condensation polymerization causing undesirable reactions. Preferred are the polyesters made using the double metal cyanide catalysts as described above.

A saturated aliphatic dihydroxy terminated polyester, also, is employed in the in-mold coating composition to give some degree of flexibility to the coating. It is used in a minor molar amount as compared to the unsaturated polyester diol. The average molecular weight of the saturated polyester is from about 1,500 to 3,000. It can be made by methods well known to the art and should be free of catalyst residues which would adversely affect the urethane forming reaction. Examples of such polyesters are polyethylene butylene adipate (preferred), polyethylene butylene sebacate, polypropylene adipate, polybutylene suberate, polypropylene sebacate and the like and mixture thereof.

The aliphatic polyol crosslinker used in the urethane reaction can be glycerol, trimethylol propane, 1,2,6-hexane triol, pentaerythritol, pentols, sorbitol and other aliphatic polyols having from 3 to 6 hydroxyl groups and their propylene oxide, butylene oxide and/or isobutylene oxide adducts (which may contain up to 10 mol % ethylene oxide or be endcapped with ethylene oxide) having an average molecular weight of from about 92 to 1,000. Methods of making the alkylene oxide adducts of the polyols (except glycerine) using a double metal cyanide catalyst are shown by U.S. Pat. No. 3,829,505. Grafted polyols may, also, be used such as those shown by U.S. Pat. Nos. 3,304,273; 3,383,351 and 3,294,711. If the adducts or telomers are made using KOH or NaOH, the resulting polyetherpolyol should be washed and/or neutralized to reduce or remove the alkaline material which may adversely catalyze the urethane reaction. The aliphatic polyol crosslinker is used in an amount sufficient with the unsaturated polyester diol and any other OH compound to provide adequate crosslinking with the diisocyanate to provide a urethane network of sufficient crosslink density to provide the desired hardness and toughness. The propylene oxide adducts of pentaerythritol having an average molecular weight of from about 400 to 600 are preferred.

The diisocyanate employed may be used as such or reacted with part of the polyol to form a prepolymer, especially when hexamethylene diisocyanate is employed since this isocyanate is believed to be carcinogenic. The diisocyanate should be used in an amount by weight sufficient to provide from about 50 to 120%, preferably from about 80 to 99%, of the stoichiometric amount of —NCO groups required to react with all of the active hydrogen atoms (as determined by the Zerewitinoff method, J.A.C.S., Vol. 49, p. 3181 (1927) e.g., hydroxyl groups, of the polyester(s) and polyol(s) and any other OH containing organic compound in the in-mold coating compound taking into consideration the possibility of forming also some biuret or allophanate linkages. Examples of useful diisocyanates or mixtures thereof to employ are 2,4-tolylene diisocyanate (TDI), 2,6-tolylene diisocyanate (TDI), 4,4'-diphenyl methane diisocyanate (MDI), hydrogenated 4,4'-diphenyl methane diisocyanate (or 4,4'-dicyclohexyl methane diisocyanate), polymeric forms of TDI, MDI and hydrogenated MDI, xylene diisocyanate, isophorone diisocyanate and hexamethylene diisocyanate. Of these diisocyanates it is preferred to use 4,4'-diphenyl methane diisocyanate.

The ethylenically unsaturated monomer used to crosslink the unsaturated polyester diol and provide, together with the urethane linkages, a thermoset coating is selected from the group consisting of styrene, alpha methyl styrene, vinyl toluene, methyl methacrylate, acrylamide, acrylonitrile, methyl acrylate and mixtures of these. Of these monomers styrene is preferred. The ethylenically unsaturated monomer is used in an amount sufficient to copolymerize with and/or crosslink the unsaturated polyester diol on being catalyzed by means of a free-radical catalyst to form a crosslinked thermoset polyester resin coating.

A free-radical or free-radical generating catalyst such as a peroxide is used to catalyze the copolymerization or crosslinking between the ethylenically unsaturated low molecular weight monomer and the unsaturated polyester. Examples of free-radical catalysts include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,5-dimethyl-1,2-dioxacyclopentane, t-butyl peroxy (2-ethyl hexanoate), 2,5-dimethyl-2,5-di(benzoyl peroxy) hexane, t-butyl peroxy (2-ethyl butyrate), 2,5-dimethyl-2,5-bis(t-butyl peroxy) hexane, cumyl hydroperoxide, diacetyl peroxide, 3,5-dihydroxy-3,5-dimethyl-1,2-oxacyclopentane, and 1,1-bis(t-butyl peroxy)-3,3,5-trimethyl cyclohexane and the like and mixtures thereof. It is desirable sometimes to use mixtures of peroxides to take advantage of their different decomposition rates and times at different temperatures and so forth. Preferred catalysts are tertiary butyl perbenzoate and tertiary butyl peroctoate in diallyl phthalate and mixtures thereof. For more information on peroxide catalysts please see "Encyclopedia of Polymer Science and Technology," Vol. 9, Interscience Publishers a division of John Wiley & Sons, Inc., New York, 1968, pages 814 to 841.

The polyurethane catalyst, if employed since it is not always needed, should be one which does not accelerate the decomposition of the peroxide catalyst. The urethane catalyst when used should facilitate readily the curing of the coating composition; that is, the formation of the urethane network between the isocyanate and active hydrogen containing compounds should proceed simultaneously and smoothly along with the crosslinking operation caused by the free-radical catalyst between the unsaturated monomer and the unsaturated polyester. Examples of such catalysts are dibuytyl tin dilaurate (preferred), dibutyl tin diacetate, tributyl tin acetate, dilauryl tin diacetate, dibutyl tin di-2-ethyl hexoate, di-2-ethyl hexyl tin bis(2-ethyl hexoate), dibutyl tin distearate, tetramethyl tin and tetra-n-butyl tin and the like and mixtures thereof.

The free-radical catalysts and the polyurethane forming catalysts are used in a minor amount sufficient to chain extend and cross-link the functional components of the coating composition to obtain a thermoset material.

The composition additionally can be filled or compounded to give the desired viscosity and flow to the composition for molding and to afford the desired physical properties to the resulting thermoset coating. Examples of such fillers or compounding ingredients are fillers like clay, talc, MgO, Mg(OH)$_2$, CaCO$_3$ and silica, mold release agents, red iron oxide, TiO$_2$, carbon black, organic color pigments like phthalocyanine blue or green, antidegradants, U-V absorbers, calcium silicate, hollow glass or resin micro-spheres, thickening agents, inhibitors and the like. Preferred fillers are clay, talc, MgO, Mg(OH)$_2$, CaCO$_3$ and silica and mixtures thereof. These fillers and compounding ingredients should be used in amounts sufficient to provide satisfactory results. However, care should be exercised in the use of high filler contents as this may give high viscosities and result in flow and handling difficulties.

All of the ingredients of the in-mold coating composition should be kept dry or have a minimal amount of moisture or the water content should be controlled to obtain reproducible results, to avoid using unnecessary amounts of isocyanates and to prevent foaming or pore formation.

All of the ingredients of the in-mold coating composition can be mixed together and then poured or injected onto the substrate and molded and cured. Several streams or lines can be used to deliver the components of the in-mold coating composition to a mixing head or machine. However, since the mixed in-mold coating composition has a limited shelf-life or storageability due to the reactivity of the diisocyanate with the polyols, it is preferred to react the diisocyanate with a portion of the polyol(s) to form an isocyanate terminated prepolymer having excess free isocyanate. Moreover, since the diisocyanate may be rather fluid, it is preferred for handling purposes to increase its viscosity by forming the isocyanate prepolymer. Mixing of the ingredients should be thorough. A stream of the prepolymer and a stream containing the unsaturated polyester composition of the desired viscosity are then fed to the mixing head of a mixing machine which then delivers the reactable in-mold coating to the surface of the substrate where it is molded and cured to the substrate. Injection or compression, transfer molding, or other molding apparatus or machines can be used for the in-mold coating, and temperatures and times can be those generally disclosed in U.S. Pat. No. 4,081,578, above. Molding apparatus and methods for molding substances and in-mold coating, also, may be found in U.S. Pat. Nos. 4,076,780; 4,076,788 and 4,082,486.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, electronic part encapsulation, structural panels and so forth. The fiberglass reinforced polyester (FRP) substrate can be a sheet molding compound (SMC) or a bulk molding compound (BMC), wet lay-up or other thermosetting FRP material as shown by "Modern Plastics Encyclopedia," October, 1975, Vol. 52, No. 10A, McGraw-Hill, Inc., New York, pages 105 to 107.

The following examples will serve to illustrate the present invention with more particularity to those skilled in the art.

EXAMPLE I

Fiberglass polyester resin compositions were compression molded and cured as plates according to the process of U.S. Pat. No. 4,081,578 to make a thermoset substrate. The composition used for the substrate contained the following ingredients:

| Ingredient | Parts by Weight |
|---|---|
| "Paraplex" P340 | 4,000 |
| "Paraplex" P681 | 2,240 |
| "Paraplex" P543 | 772 |
| "Camel-Wite" | 10,520 |
| TBP | 70 |
| Zinc stearate | 350 |
| Mg(OH)$_2$ | 316 |
| Glass fibers | 7,830 |

After cure, the thermoset substrate plates were furrowed or drilled (as described below) and in-mold coated with several compositions according to the process of U.S. Pat. No. 4,081,578 by mixing the resin composition and the low shrink additive together and then mixing therewith the isocyanate hardener composition. The resulting mixture was then deposited on the outer surface of the compression molded substrate and cured under heat and pressure. The ingredients of the in-mold compositions were as follows:

| Isocyanate (hardener) Composition | |
|---|---|
| Ingredient | Parts by Weight |
| "Isonate" 143L | 16.7 |
| "Pluracol" PeP 450 | 2.4 |
| TBP | .6 |
| PDO solution | .1 |

| Resin Composition A | |
|---|---|
| Ingredient | Parts by Weight |
| Polyester | 1050.6 |
| Georgia Talc 450 | 748 |
| "Formrez" L4-71 | 298 |
| "Pluracol" PeP 450 | 163 |
| "Zelec" UN | 1.7 |
| Benzoquinone solution | 13.1 |
| "Stan-Tone" | 143 |

| Resin Composition B | |
|---|---|
| ingredient | Parts by Weight |
| Polyester | 15 |
| "Formrez" L4-71 | 4.35 |
| "Pluracol" PeP 450 | 3.15 |
| "Zelec" UN | .025 |
| Benzoquinone solution | .35 |
| T-12 solution | .10 |

| Resin Composition C | |
|---|---|
| Ingredient | Parts by Weight |
| "Paraplex" P340 | 50 |
| "Paraplex" P701 | 37.7 |
| CaCO$_3$ | 12.1 |
| Zinc stearate | 4.4 |
| PDO solution | .5 |
| TBP | .5 |
| "Marinco" H | 3.9 |

| Low Shrink Additive Composition | |
|---|---|
| Ingredient | Parts by Weight |
| LP-90, 40% polyvinyl acetate in styrene | variable |

| Other Additive | |
|---|---|
| Ingredient | Parts by Weight |
| Talc and/or CaCO$_3$ | variable |

The amounts of materials used and the results obtained are shown in Table I below:

TABLE I

| Run No. | Resin Composition | Resin Composition Grams | Isocyanate Hardner Composition Grams | LP-90 Grams | Talc Grams | CaCO$_3$ Grams | Shrinkage | Adhesion | PPVA/H IMCC*** |
|---|---|---|---|---|---|---|---|---|---|
| 1 | C* | — | — | — | — | — | Poor-Fair (M) | Poor | — |
| 2 | C | — | — | — | — | — | Excellent (M) | Poor | — |
| 3 | C | — | — | — | — | — | 0.22% (N) | None | — |
| 4 | 3 | 28 | 10 | — | — | — | Poor (M) | Poor | — |
| 5 | B | 28 | 10 | — | 12.75 | — | Poor (M) | Good/ | — |

TABLE I-continued

| Run No. | Resin Composition | Resin Composition Grams | Isocyanate Hardner Composition Grams | LP-90 Grams | Talc Grams | CaCO$_3$ Grams | Shrinkage | Adhesion | PPVA/H IMCC*** |
|---|---|---|---|---|---|---|---|---|---|
| 6 | A | 40.7 | 10 | — | — | — | 8.6% (N) | Excellent Good | — |
| 7 | B | 28 | 10 | 10 | — | — | Good (M) | Poor | 8.3 |
| 8 | B | 28 | 10 | 10 | 12.75 | — | Good (M) | Excellent | 6.6 |
| 9 | A | 40.7 | 10 | 9.5 | — | — | 2.1% (N) | Good | 6.3 |
| 10 | B | 28 | 10 | 10 | — | 12.75 | Good (M) | Good | 6.6 |
| 11 | A | 40.7 | 10 | 19.3 | — | — | 4.5% (N) | Good | 11. |
| 12 | B | 28 | 10 | 20 | 12.75 | — | Good/ Excellent (M) | Excellent | 11. |
| 13 | A | 40.7 | 10 | 9.5 | 5.8 | — | 2.2% (N) | Good | 5.7 |
| 14 | A | 40.7 | 10 | 19.3 | 10.5 | — | 2.4% (N) | Good | 9.6 |
| 15 | A | 40.7 | 10 | 24.4 | 10.5 | — | 3.1% (N) | Good | 11. |
| 16 | A | 40.7 | 10 | 24.4 | 14.0 | — | 2.0% (N) | Good | 11. |
| 17 | A | 40.7 | 10 | 24.4 | 10.5 | 4.7 | 2.5% (N) | Weak | 11. |
| 18 | A | 40.7 | 10 | 9.5 | — | 14 | 2.1% (N) | Good | 5.1 |
| 19 | A | 40.7 | 10 | 19.3 | — | 24.4 | 1.4% (N) | Good | 8.2 |
| 20 | A | 40.7 | 10 | 24.4 | — | 31.4 | 1.7% (N) | Good | 9.2 |
| 21 | B | 28 | 10 | 25 | — | 37.5 | Excellent (M) | Good | 10. |
| 22 | A** | 40.7 | 10 | 25.6 | — | 58 | 0.73% (N) | No Data | 7.5 |
| 23 | B | 28 | 10 | 25 | — | 75 | Excellent (M) | Good | 7.2 |

*Minus CaCO$_3$.
**Plus 1.25 grams styrene.
***Parts by weight polyvinyl acetate per se per 100 parts by weight of entire in-mold coating composition.

The adhesion test was done by cross hatching the coating with a knife and attempting to peel-off the coating. The degree to which the coating resisted peeling-off was a measure of its adhesion to the thermoset polyester fiber glass substrate.

Two methods of coating shrinkage evaluation were used. In the first method, see M above, after molding the 15"×15" FRP plate, a 0.08"× ~4" furrow was cut into the plate, and the in-mold coating composition was hand-poured. After curing and cooling the coated plate part, the shrinkage of the coating was visually judged on the basis of how well it bridged the furrow; for example, how much of a visible depression remained at the furrow due to shrinkage of the coating (excellent =<1.5%, good=1.5-3%, fair=3-4% and poor=>4% shrinkage). In the second method, see N above, after curing the 15"×15" FRP plate, the plate was removed from the mold and a one-inch diameter hole was drilled through it. The plate was then reseated in the mold and the in-mold coating composition was hand-poured. After curing and cooling, the thickness of the molded-in plug versus the adjacent FRP thickness was a measure of the coating's shrinkage.

It is noted that while Runs 1 to 3 (without isocyanate, without polyvinyl acetate) had poor-fair, 0.22% or excellent shrinkage, the adhesion was unsatisfactory. Runs 4 to 6 (with isocyanate, without polyvinyl acetate) had poor to excellent adhesion but the shrinkage was unsatisfactory. Runs 7 to 23 showed good to excellent shrinkage results with only one run showing a shrinkage greater than 4%. Also, except in two instances the adhesion was good or excellent.

EXAMPLE II

The method of this example was the same as that of Example I, above. The same isocyanate (hardener) composition was used. The resin composition was as follows:

| Resin Composition D | |
|---|---|
| Ingredient | Parts by Weight |
| Polyester | 1500 |
| "Formrez" L4-71 | 435 |
| "Pluracol" PeP 450 | 315 |
| "Zelec" UN | 2.5 |
| Benzoquinone solution | 35 |
| T-12 solution | 10 |
| Georgia Talc 650 | 1093 |

The steps of mixing of the components of the in-mold composition, coating the substrate FRP plate, compression molding and curing were the same as those of Example I, above. The relative proportions of the components of the in-mold coating composition were as follows:

| Component | Parts by Weight |
|---|---|
| Isocyanate (hardener) composition | 40.8 |
| Resin Composition D | 10 |
| Low-shrink additive composition | 20 |

The results obtained on testing are shown in Table II, below:

| Run No. | Low-Shrink Additive Composition | Shrinkage | PLSH/H IMCC**** |
|---|---|---|---|
| 31 | "Paraplex" P-543 | Poor (M) | 9.9 |
| 32 | "Paraplex" P-701 | Poor (M) | 9.9 |
| 33 | "Formrex" L4-71 35% by weight in styrene | Poor (M) | 9.9 |
| 34 | "Microthene" (PE) | Poor (M) | 28 |
| 35 | 7609 (SBR) | Poor (M) | 10.5 |
| 36 | LP-40 | Poor (M) | 11 |
| 37 | LP-60 | Poor (M) | 11 |
| 38 | LP-90 | Good (M) | 11 |
| 39 | LP-100 | Fair to | 11 |

| Run No. | Low-Shrink Additive Composition | Shrinkage | PLSH/H IMCC **** |
|---|---|---|---|
| | | Good (M) | 5 |

**** Parts by weight of low shrink additive per se per 100 parts by weight of entire in-mold coating composition.

The results of the runs of this example show that polyvinyl acetate gives fair to good results as to shrinkage as compared to the poor results exhibited by polymethyl methacrylate, acid modified polymethyl methacrylate, polyethylene butylene adipate, polyethylene, high styrene-butadiene copolymer, acid modified polyvinyl acetate and acid modified polycaprolactone.

NOTES

Polyester—Polypropylene fumarate polyester, OH terminated, acid No. of less than 1, average molecular weight of about 2,400, about 15 double bonds, in styrene monomer (70% by weight PE, 30% STY). Prepared according to the teachings of U.S. Pat. No. 3,538,043 by reacting propylene oxide and maleic anhydride initiated by fumaric acid using a double metal cyanide catalyst and isomerized with piperidine.

Georgia Talc 450 and 650, magnesium silicate (Soapstone).

"Formrez" L4-71—Ethylene butylene adipate polyester, about 2,000 m.w., saturated, OH terminated. Witco Chemical Company.

"Pluracol" PeP 450—Propylene oxide adduct of pentaerythritol, average molecular weight about 450, equivalent hydroxyl weight of 101. BASF Wyandotte.

"Zelec" UN—Fatty alcohol phosphate, unneutralized. du Pont.

Benzoquinone—2% by weight benzoquinone in styrene.

T-12—1% by weight dibutyl tin dilaurate in styrene.

"Stan-Tone"—HLC No. 6543 pigment. Mixture of $TiO_2$ and carbon black in "Pluracol" PeP 450, 60% solids. Harwick Chemical Corp.

"Isonate" 143 L—Essentially diphenylmethane-4,4'-diisocyanate, a liquid. The Upjohn Company.

TBP—Tertiary butyl perbenzoate.

PDO—Tertiary butyl peroctoate, 50% by weight in diallyl phthalate.

"Paraplex" P 340—A 65% by weight solution of polyester in styrene, the polyester being essentially a polypropylene fumarate, OH No. of 35, COOH No. of 35, average molecular weight of about 1,600. Rohm & Haas Company.

"Marinco" H—Magnesium hydroxide, Merck & Co., Inc.

"Paraplex" P 681—35% by weight solution of polymethylmethacrylate containing some carboxyl groups in styrene. Rohm & Haas Company.

"Paraplex" P 543—35% by weight solution of polymethyl methacrylate in styrene. Rohm & Haas Company.

"Paraplex" P 701—35% by weight solution of acid modified polymethyl methacrylate in styrene. Rohm & Haas Company.

"Microthene"—Polyethylene, powdered. U.S. Industrial Chemical Co.

7609—XD-7609. Copolymer of about 63% styrene and 37% butadiene-1,3, may contain some homopolystyrene. 54.1% trans-1,4, 13.1% vinyl, Mn about 115,000.

About 37% solids in styrene. Dow Chemical Co.

"Bakelite" LP-40—40% by weight solution of acid modified polyvinyl acetate in styrene. Union Carbide Corp.

"Bakelite" LP-60—40% by weight solution of acid modified polycaprolactone in styrene. Union Carbide Corp.

"Bakelite" LP-90—40% by weight solution of polyvinyl acetate in styrene, viscosity of 1,800 centipoises at 25° C. (Model LVT Brookfield viscometer # 4 spindle at 60 rpm), specific gravity 20/20° C. ($H_2O=1$) of 1.008 and solidification temperature of 5° C. Union Carbide Corp.

"Bakelite" LP-100—40% by weight solution of polyvinyl acetate in styrene. Viscosity of 5,000 centipoises, water content of 0.20 weight percent, and acid number of 3.0. Union Carbide Corp.

"Camel-Wite"—Calcium carbonate (limestone), average particle size of 3.3 microns. Campbell Grove Division of H.M. Royal.

We claim:

1. A thermosetting composition comprising essentially:
   (a) an unsaturated aliphatic polyester fumarate diol having an average molecular weight of from about 1,500 to 4,500 and from about 8 to 30 internal aliphatic carbon-to-carbon double bonds,
   (b) a saturated aliphatic polyester diol flexibilizer having an average molecular weight of from about 1,500 to 3,000, (b) being present in a minor molar amount as compared to (a),
   (c) an aliphatic crosslinking polyol having from 3 to 6 hydroxyl groups and an average molecular weight of from about 92 to 1,000,
   (d) a diisocyanate selected from the group consisting of 2,4-tolylene diisocyanate, 2,6-tolylene diisocyanate, 4,4'-diphenyl methane diisocyanate, 4,4'-dicyclohexyl methane diisocyanate, polymeric forms of TDI, MDI and hydrogenated MDI, xylene diisocyanate, isophorone diisocyanate and hexamethylene diisocyanate and mixtures thereof, said diisocyanate being present in an amount by weight sufficient to provide from about 50 to 120% of the stoichiometric amount of —NCO groups required to react with all of the active hydrogen atoms in said composition, and
   (e) an ethylenically unsaturated monomer selected from the group consisting of styrene, alpha methyl styrene, vinyl toluene, methyl methacrylate, acrylamide, acrylonitrile, methyl acrylate and mixtures thereof, said monomer being present in an amount sufficient to copolymerize with and crosslink said unsaturated polyester, in admixture with
   (f) from about 2 to 20 parts by weight of polyvinyl acetate per 100 parts by weight of said total composition.

2. A composition according to claim 1 in which said diisocyanate is present in an amount by weight sufficient to provide from about 80 to 99% of the stoichiometric amount of —NCO groups required to react with all of the active hydrogen atoms in said composition.

3. A composition according to claim 1 containing additionally a filler selected from the group consisting of clay, talc, MgO, $Mg(OH)_2$, $CaCO_3$ and silica and mixtures thereof.

4. A composition according to claim 1 in which in said composition (a) is a copolymer obtained from maleic anhydride and propylene oxide, (b) is polyethylene butylene adipate, (c) is the adduct of propylene oxide and pentaerythritol having an average molecular weight of from about 400 to 600, (d) is 4,4'-diphenylmethane diisocyanate, (e) is styrene and the polyvinyl acetate of (f) is present in an amount of from about 3 to 13 parts by weight per 100 parts by weight total of said coating composition.

5. A composition according to claim 4 in which said composition contains additionally talc and/or $CaCO_3$.

6. A composition according to claim 4 in which (d) is a diisocyanate terminated polyurethane prepolymer containing excess diisocyanate made by reacting the diisocyanate of (d) with at least a portion of (c).

* * * * *